Aug. 10, 1948.  S. S. BARKER  2,446,685
CONVEYER CHAIN STRUCTURE
Filed Feb. 6, 1946  2 Sheets-Sheet 1
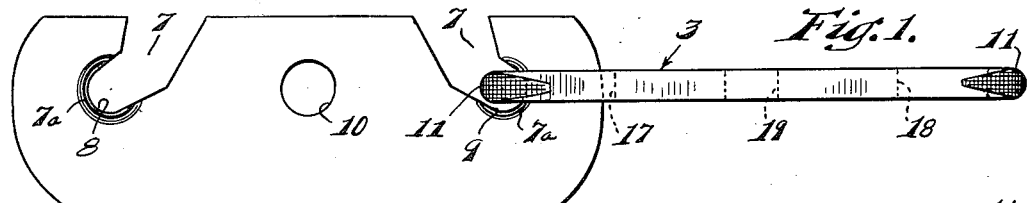
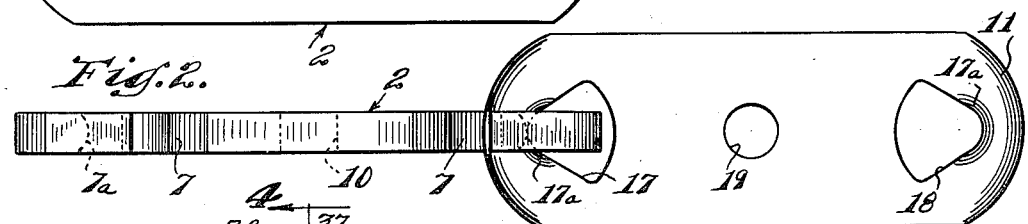
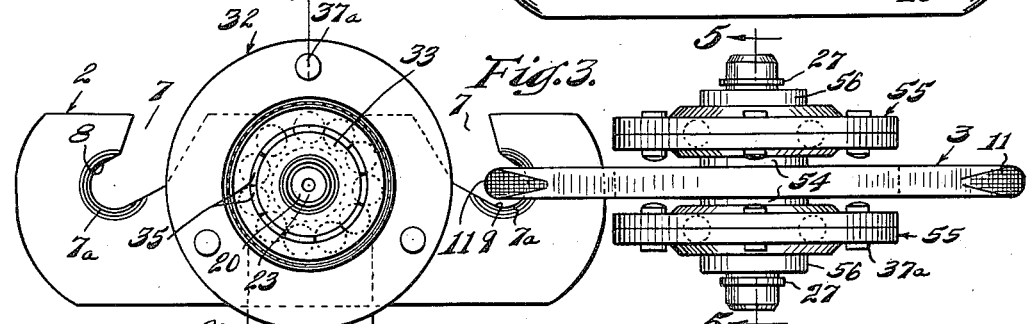
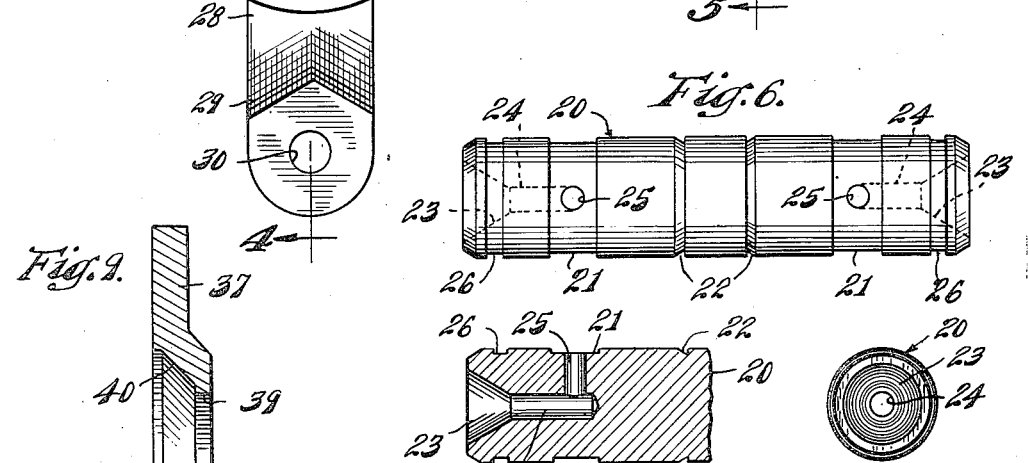
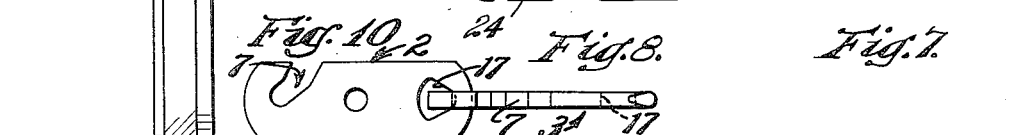
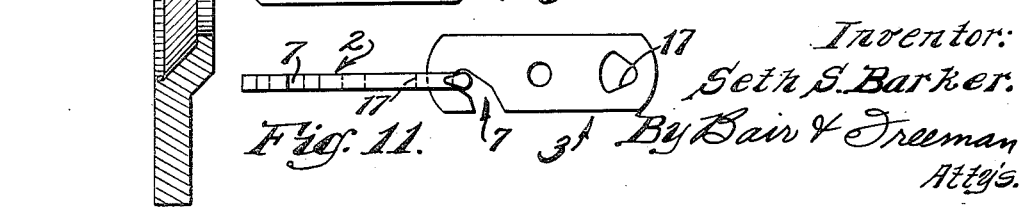
Inventor:
Seth S. Barker.
By Bair & Freeman
Attys.

Aug. 10, 1948. S. S. BARKER 2,446,685
CONVEYER CHAIN STRUCTURE
Filed Feb. 6, 1946 2 Sheets-Sheet 2

Inventor:
Seth S. Barker.
By Bair & Freeman
Attys.

Patented Aug. 10, 1948

2,446,685

UNITED STATES PATENT OFFICE 2,446,685

CONVEYER CHAIN STRUCTURE

Seth S. Barker, Ottumwa, Iowa

Application February 6, 1946, Serial No. 645,724

7 Claims. (Cl. 198—177)

My improved chain structure is of the kind which has alternate links provided with wheels for traveling in an enclosed housing. Each alternate link has a pair of vertical wheels and each intermediate link has a pair of horizontal wheels. These wheels are adapted to cooperate with the top and bottom and side walls of a housing or with suitable tracks which function in the same way as a housing for furnishing trackways and guide means for the wheeled links.

My improved chain is of the kind intended to carry articles such, for instance, as birds in a poultry dressing establishment from point to point for different processing operations. It may be used however for carrying a great variety of articles.

Ordinarily my invention is embodied in the form of an endless chain which may travel around corners and also at different levels above the floor.

It is my object to provide such a chain having links of simple and inexpensive construction, comprising flat, strip-like plates, which may be connected together without rivets or pintles and which cannot become disconnected when traveling in a housing or on suitable tracks.

One purpose is to provide such links which will turn as short corners as practicable, without binding or becoming disconnected.

Another object is to provide such links having novel wheels suitably mounted on them and provided with anti-friction elements within themselves.

A further object is to provide wheel structures which can be conveniently and thoroughly lubricated.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of two links (omitting the wheels);

Figure 2 is a plan view of the said two links;

Figure 3 is a side elevation of the links of Figure 1 with the wheels thereon;

Figure 6 is a plan view of the axle for the wheels;

Figure 7 is an end elevation of the axle shown in Figure 6;

Figure 8 is a longitudinal sectional view of a portion of the axle shown in Figure 6;

Figure 9 is a vertical central view of the stamping forming part of a wheel;

Figure 10 is a side elevational view of two links of a slightly modified form, the wheels being omitted; and Figure 11 is a plan view of the links shown in Figure 10.

Figure 4:
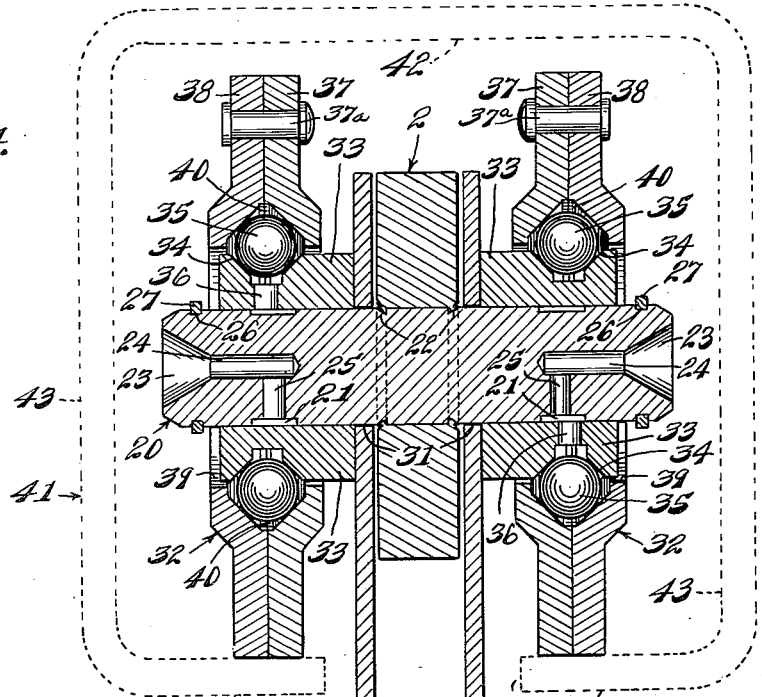
Figure 4 is a vertical sectional view taken on the line 4—4 of Figure 3, the housing for the chain being shown in dotted lines.

In the accompanying drawings I have shown in Figures 1 and 2 a pair of links 2 and 3 forming parts of an endless chain, which may have as many such pairs as may be desirable. Each link is in the general form of a flat plate, longer than it is wide and thick enough to give it adequate strength. Each link 2 normally travels in a vertical plane and has in its upper edge near each end a notch 7. The notches 7 are formed at their lower parts with rounded portions 8 and 9 and are undercut toward the ends of the link. Each link 2 has a central hole 10 to receive the axle for the wheels or rollers hereafter described.

Each link 3 is also made in the form of a flat strip, preferably of the same length and width as the link 2. The links 3 normally travel in a horizontal plane. Each link 3 has near its opposite ends, holes 17 and 18 which are narrower and rounded at their portions nearest the end of the link body.

Each link 3 has a central hole 19 to receive an axle. The parts 11 of the link 3 are adapted to be received in the notches 7 of alternate links for thus connecting the links together into a chain. The edges of the parts 11, and of the material around the notch portions 8 and 9, are rounded off as indicated at 17a and 7a so that the articulated links 1 and 2 will play freely on each other without binding in the use of the chain.

It is obvious that the hooks formed by the notches in the links 2 could be provided on the links 3, and that the holes 17 of the links 3 could be formed in the links 2 or that each link could be provided with a hook at one end and a hole at the other, and the same interconnection of links could be attained. Figures 10 and 11 illustrate links 2 and 3 interconnected, and each having a notch 7 at one end and a hole 17 at the other end.

By rounding off the material at the edges of the undercut parts of the notches and the tapered ends of the holes 17, free articulation is permitted with minimum wear.

Furthermore, when the links are assembled and the chain is in use, the links will tend to stay in planes at right angles to each other when taut.

Links of the kind herein described have the great advantage that when assembled in a chain, the chain can be turned around corners at very sharp angles. For example, a chain made up of links 4⅜ inches overall length can be made to turn around a sprocket in a full 180° turn in 20 inches. The same short turn can be made in a vertical plane. I have further found that a chain made of such lengths can be given a full 90° twist in 4 feet. These turns and twists may be made in practice without undue binding. I know of no other chain in which such turns and twists can be made with links of the same overall length.

Wheels, hereinafter described, are mounted on the opposite sides of each link 2 by means of an axle 20 extending through the hole 10 and fixed to the link 2. Each axle 20 has annular oil grooves 21. Each axle 20 has in each end a countersink 23, from the bottom of which a passage 24 extends lengthwise of the axle. One or more passages 25 connects each passage 24 with the oil groove 21. Near the outer ends of the axle 20 are grooves 26 to receive resilient locking rings 27. The axle 20 has shallow grooves 22, into which material of the links may be forced for fixing the links on the axle. (See Figs. 4 and 6.) On each axle 20 on the opposite sides of the link 2 are hanger arms 28. Substantially below the axle 20 the hanger arms 28 are bent to bring them together as indicated at 29, and the lower parts are welded or otherwise fastened together and provided with a hole 30. It will be understood that the hanger arms 28 have holes 31 to receive the shaft 20.

Mounted on each end of the axle 20 of each link 2 is a normally vertical wheel or roller 32 (Fig. 4). Each wheel 32 has a hub 33 in the periphery of which is formed a race 34 for balls 35. The ball race 34 communicates with the oil groove 21 by a passage 36.

Riding on each hub 33 is a wheel tread member comprising two elements 37, 38, each preferably made in the form of an annular stamping illustrated in section in Figure 9. The elements 37, 38 are provided with central holes 39 and the bodies of the elements 37, 38 around the holes 39, are pressed laterally to form ball races 40 receiving the balls 35. The elements 37, 38 may be welded or otherwise rigidly connected together in the assembled wheels as by rivets 37a.

The wheels can be removed from the axle by removing the locking rings 27.

Figure 5:
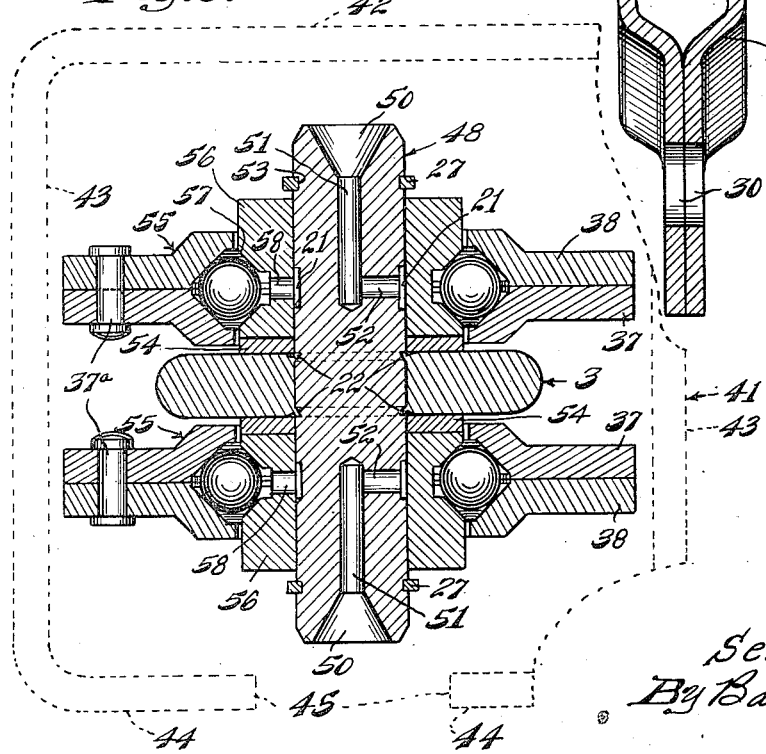
Figure 5 is a vertical sectional view taken on the line 5—5 of Figure 3, the housing for the chain being shown in dotted lines.

My chain members preferably travel in a housing indicated in dotted lines at 41, having a top 42, sides 43, and a bottom 44 provided with a longitudinal slot 45 through which the hanger arms 28 project. The housing is illustrated in dotted lines in Figure 5.

The axles 48 for the links 3 normally travel in vertical position. The axle 48 extends through the hole 19 and is fixed to the link 3 as at 22. On each side of the link 3 is a washer 54. The axles 48 have countersinks 50 in their ends, communicating with longitudinal passages 51 which in turn communicate with radial passages 52 and oil grooves 21. On the ends of the axle 20 are mounted wheels 55 which are similar to the wheels 32 except that their hubs 56 differ slightly, as shown. The hubs 56 have ball races 57 to receive balls 35 and have passages 58 extending from the ball races and communicating with the oil grooves 21.

The tread portions of the wheels 55 are similar in construction to those of the wheels 32.

In actual use the wheels 32 travel normally on the bottom 44 of the housing 41 and any lateral movement of the wheels 55 is limited by the sides 43 of the housing 41. Travel is imparted to the chain made up of the links hereinbefore described by any suitable sprocket wheel, or any other means not here described.

A great advantage of this chain herein described, lies in its simplicity which makes for low cost of material and of fabrication.

The links 2 and 3 can be connected without any rivets or pintles, and they have enough play to operate without binding on curves, yet they can never come apart while in the housing.

The chain is sturdy and long-wearing. Provision is made for thorough lubrication.

It is my purpose to cover by my claims any modified form of structure which may be within their scope and the scope of my invention.

I claim as my invention:

1. In a chain structure, alternate links, each comprising a flat plate-like member, adapted to normally travel in a vertical plane, having in its upper edge near its ends, notches with portions near their bottoms undercut toward the respective ends of the link, and connecting links, each comprising a flat plate-like member, adapted to normally travel in a horizontal plane and having near each end a hole tapered toward its adjacent end, and interfitting with notches of alternate links.

2. A chain having alternate vertical flat plate-like links and connecting horizontal flat plate-like links, each alternate link having notches in its upper edge near its ends, with lower parts undercut toward the link ends, each connecting link having near its ends holes tapered toward the link ends for connection with alternate links, and wheels on the opposite sides of each link, said chain being adapted for use with upper, lower and side track elements for cooperation with the respective wheels, to limit their vertical and horizontal movement and prevent the links from coming apart during chain travel.

3. A chain having alternate vertical flat plate-like links and connecting horizontal flat plate-like links, each alternate link having notches in its upper edge near its ends, with lower parts undercut toward the link ends, each connecting link having near its ends holes tapered toward the link ends for connection with alternate links, and wheels on the opposite sides of each link, said chain being adapted for use with upper, lower and side track elements for cooperation with the respective wheels, to limit their vertical and horizontal movement and prevent the links from coming apart during chain travel, and hanger arms hung on the vertical links between the links and its wheels, connected together at their lower ends.

4. In a chain structure, alternate links, each comprising a flat plate-like member, adapted to normally travel in a vertical plane, having in its upper edge near its ends, notches with portions near their bottoms undercut toward the respective ends of the link, and connecting links, each comprising a flat plate-like member, adapted to normally travel in a horizontal plane and having near each end a hole tapered toward its adjacent end, and interfitting with notches of alternate links, hanger arms on opposite sides of each alternate link, projecting downwardly therefrom and having their lower ends connected together, a shaft extending through the arms and the central part of each alternate link, and wheels on the ends of the shaft, a shaft extending vertically through each connecting link, and wheels on the ends of said last shaft.

5. In a chain structure, a series of detachably connectible links, each comprising a flat plate-like member, said links having notches and holes respectively in their adjacent ends, the notches being extended inwardly from the edges near the ends of the links, and being undercut at their bottoms toward the link ends, the holes being located near the ends of the links and tapered toward the link ends.

6. In a chain structure, a series of detachably connectible links, each comprising a flat plate-like member, said links having notches and holes respectively in their adjacent ends, the notches being extended inwardly from the edges near the ends of the links, and being undercut at their bottoms toward the link ends, the holes being located near the ends of the links and tapered toward the link ends, the material of the links being rounded off at the undercut portions of the notches and at the tapered portions of the holes to allow free articulation of the links with each other.

7. In a chain structure, alternate links, each comprising a flat plate-like member, adapted to normally travel in a vertical plane, and connecting links, each comprising a flat plate-like member, adapted to normally travel in a horizontal plane, each of said alternate and connecting links having a hole adjacent one end, said hole being tapered toward the respective end of the link, and each link having a notch adjacent its other end, said notch having its bottom undercut toward the respective end of the link, said holes and notches forming elements for interengagement between successive links to form a chain.

SETH S. BARKER.

REFERENCES CITED

The following references are of record in the file of this patent:

UNITED STATES PATENTS

| Number | Name | Date |
|---|---|---|
| 201,698 | Otstot | Mar. 26, 1878 |
| 452,122 | Kotter | May 12, 1891 |
| 478,416 | Dodd et al. | July 5, 1892 |
| 1,543,252 | Fuller | June 23, 1925 |
| 1,848,144 | Pribil | Mar. 8, 1932 |
| 2,187,498 | Landahl | Jan. 16, 1940 |
| 2,372,199 | Hassler | Mar. 27, 1945 |